(12) United States Patent
Sakai et al.

(10) Patent No.: US 8,870,292 B2
(45) Date of Patent: Oct. 28, 2014

(54) VEHICLE SEAT

(75) Inventors: Takashi Sakai, Aichi-ken (JP);
Kazuhiro Tawada, Nisshin (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 296 days.

(21) Appl. No.: 13/285,258

(22) Filed: Oct. 31, 2011

(65) Prior Publication Data

US 2012/0112512 A1    May 10, 2012

(30) Foreign Application Priority Data

Nov. 5, 2010    (JP) ................ 2010-248416

(51) Int. Cl.
*B60N 2/66* (2006.01)
*B60N 2/64* (2006.01)
*B60N 2/72* (2006.01)
*B60N 2/70* (2006.01)

(52) U.S. Cl.
CPC ............... *B60N 2/72* (2013.01); *B60N 2/7017* (2013.01)
USPC ................... 297/452.18; 297/452.14

(58) Field of Classification Search
USPC ............. 297/284.4, 452.18, DIG. 2, 452.14
See application file for complete search history.

(56) References Cited

U.S. PATENT DOCUMENTS

| | | | | |
|---|---|---|---|---|
| 3,639,002 A | * | 2/1972 | Tischler | 297/452.52 |
| 6,595,585 B2 | * | 7/2003 | Mundell | 297/284.4 |
| 7,585,027 B2 | * | 9/2009 | Blendea | 297/284.4 |
| 7,775,603 B2 | * | 8/2010 | Mundell et al. | 297/452.52 |
| 2001/0005096 A1 | * | 6/2001 | Nagayasu et al. | 297/452.18 |
| 2004/0245823 A1 | * | 12/2004 | Ligon et al. | 297/284.4 |
| 2012/0133183 A1 | * | 5/2012 | Kim et al. | 297/284.4 |
| 2013/0193737 A1 | * | 8/2013 | Morimoto | 297/452.18 |

FOREIGN PATENT DOCUMENTS

| | | |
|---|---|---|
| CN | 1960894 | 5/2007 |
| DE | 102007034187 | 1/2009 |
| JP | 2010-125122 | 6/2010 |
| WO | 2009/012844 | 1/2009 |

OTHER PUBLICATIONS

Germany Office action, mail date is Apr. 4, 2013, and English-language translation thereof.
China Office action, dated Oct. 10, 2013 along with an english translation thereof.

* cited by examiner

*Primary Examiner* — David R Dunn
*Assistant Examiner* — Timothy J Brindley
(74) *Attorney, Agent, or Firm* — Greenblum & Bernstein, P.L.C.

(57) ABSTRACT

Provided is a vehicle seat, including: a frame; a rod of which ends are held by the frame; and a pad of which back side is supported by the rod. The rod has: a the metal core; and a resin member that is injection molded under a state where the core is set in a forming mold and the core is positioned with respect to the forming mold by projections of the forming mold and covers the ends of the core. The resin member is locked on hooks that are formed on the frame, and recesses of the resin member, which are formed by the projections of the forming mold, are disposed in a position that is spaced from the hooks.

8 Claims, 6 Drawing Sheets

VEHICLE SEAT

INCORPORATION BY REFERENCE

The disclosure of Japanese Patent Application No. 2010-248416 filed on Nov. 5, 2010 including the specification, drawings and abstract is incorporated herein by reference in its entirety.

BACKGROUND OF THE INVENTION

1. Field of the Invention

The present invention relates to a vehicle seat that is installed in a vehicle such as an automobile.

2. Description of the Related Art

A conventional vehicle seat has, as disclosed in Japanese Patent Application Publication No. 2010-125122, a frame, a rod of which ends are attached to the frame, and a pad of which back side is supported by the rod. The rod has a metal core and a resin member that covers an outer surface of an end of the core. The resin member is locked on a hook that is formed on the frame. Therefore, the resin member can suppress noise that may be produced through direct contact of the core with the hook.

However, the resin member is formed around all the outer circumference of the core, and thus relative position of the core and the resin member may contribute unevenness of thickness of the resin member. Therefore, there has been a demand for reduction of the unevenness of the thickness of the resin member by ensuring the accurate relative position of the core and the resin member.

SUMMARY OF THE INVENTION

One aspect of the present invention made in view of the problems with the related art is to provide a vehicle seat including: a frame; a rod of which ends are held by the frame; and a pad of which back side is supported by the rod, in which the rod has: a the metal core; and a resin member that is injection molded under a state where the core is set in a forming mold and the core is positioned with respect to the forming mold by projections of the forming mold and covers the ends of the core, and in which the resin member is locked on hooks that are formed on the frame, and recesses of the resin member, which are formed by the projections of the forming mold, are disposed in a position that is spaced from the hooks.

According to the vehicle seat described above, the core is positioned with respect to the forming mold by projections of the forming mold. Thus, the relative position of the resin member that is formed in the forming mold and the core can be determined accurately. Accordingly, the present invention contributes the reduction of the unevenness of the thickness of the resin member that covers the outer surface of the core. The resin member is formed with recesses by the projections of the forming mold. An adjacent area of the recesses of the resin member has a lower strength than other areas; however, the recesses are disposed in the position that is spaced from the hooks of the frame where the resin member is locked. Thus, the adjacent area of the recesses of the resin member is hardly subjected to external force from the hooks and therefore hard to break.

In the vehicle seat described above, preferably, a first hook that is one of the hooks extends from a first side to a second side of the resin member in a radial direction and covers a part of a first side section of the resin member, and a first recess that is one of the recesses lies in an opposite side to the first side section of the resin member in the radial direction.

According to the vehicle seat as described above, the first hook and the first recess may be spaced in the radial direction of the resin member even if formed at the identical position in the longitudinal direction of the resin member, and therefore, the first hook and the first recess can be arranged without elongation of the resin member.

In the vehicle seat described above, preferably, a second hook that is another one of the hooks is spaced from the first hook in a longitudinal direction of the resin member, extends from the second side to the first side of the resin member in the radial direction, and covers a part of a second side section of the resin member, and a second recess that is one of the recesses lies in an opposite side to the second side section of the resin member in the radial direction.

According to the vehicle seat as described above, the second hook and the second recess may be spaced in the radial direction of the resin member even if formed at the identical position in the longitudinal direction of the resin member, and therefore, the second hook and the second recess can be arranged without elongation of the resin member.

In the vehicle seat described above, preferably, the rod has: an attachment member that includes the core and the resin member; and a body member, and the body member is held by the frame with the attachment member.

In the vehicle seat described above, the body member and the attachment member may be united or in separate bodies.

In the vehicle seat described above, the frame may be a frame of a seat backrest or a frame of a seat cushion of the vehicle seat.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
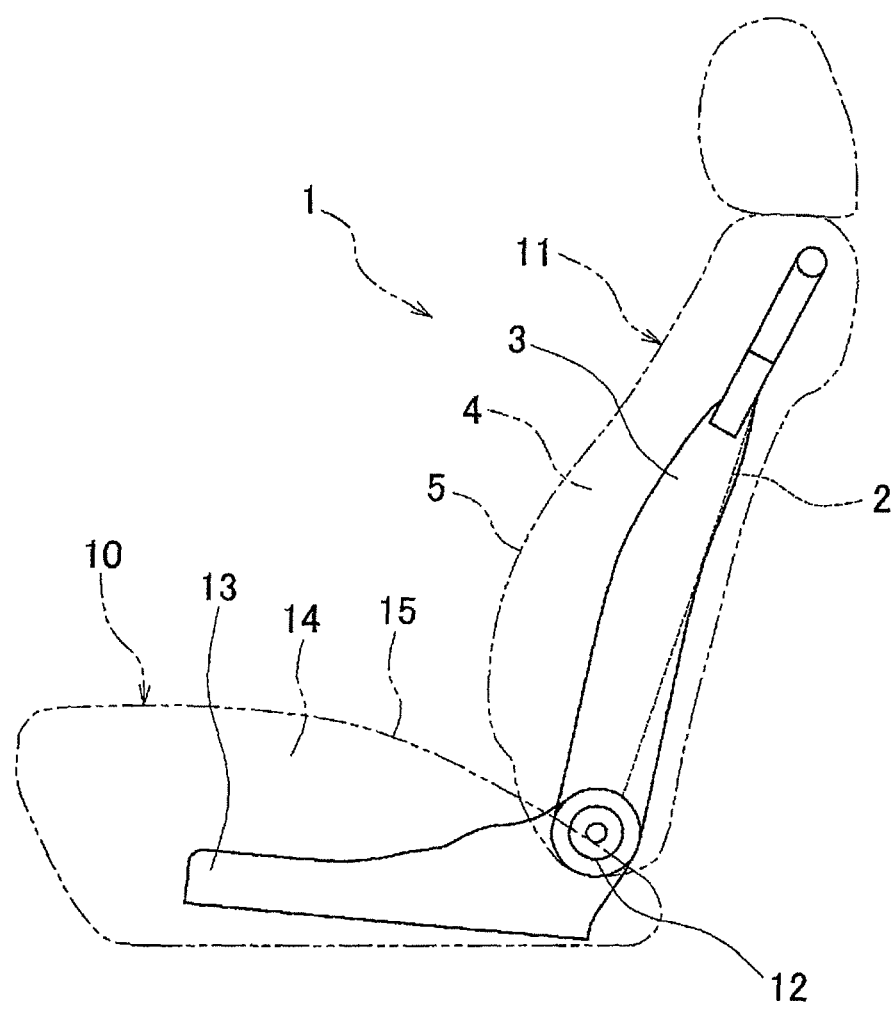
FIG. 1 is a side view of a vehicle seat according to one embodiment of the present invention.

One embodiment of the present invention will be described hereinafter with reference to FIG. 1 through FIG. 7. The vehicle seat 1 has a seat cushion 10 and a seat backrest 11 as shown in FIG. 1. The seat cushion 10 and the seat backrest 11 have frames 3 and 13, pads 4 and 14 that are attached to the frames 3 and 13, and covers 5 and 15 that cover the surfaces of the pad 4 and 14, respectively. The frame 3 of the seat backrest 11 is connected to the frame 13 of the seat cushion 10 through a recliner 12 in an angle adjustable manner.

Figure 2:
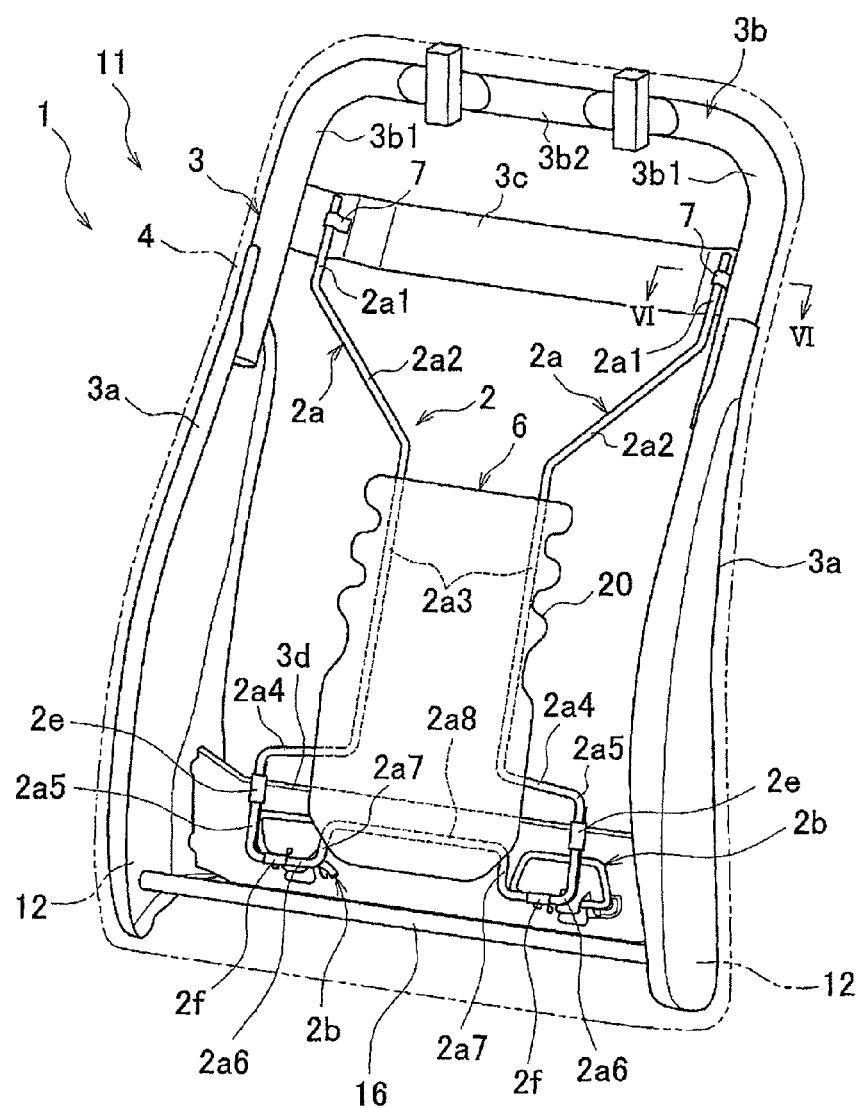
FIG. 2 is a perspective view of a frame, a rod, and a support member of the vehicle seat according to the embodiment.

The frame 3 of the seat backrest 11 has side frames 3a and an upper frame 3b as shown in FIG. 2. A side frame 3a is made of a metal plate and extends in an upward and downward direction along a side section of the seat backrest 11. The upper frame 3b is in a metal cylinder form and has vertical sections 3b1 that extend upward from an upper section of the side frames 3a and a connecting section 3b2 that connects the upper section of the vertical sections 3b1.

The frame 3 has an upper reinforcing member 3c and a lower reinforcing member 3d. The upper reinforcing member 3c is made of a metal plate and extends in a width direction. Right and left side sections of the upper reinforcing member 3c are fixed on back surfaces of the vertical sections 3b1 of the upper frame 3b. The lower reinforcing member 3d is made of a metal plate and extends in the width direction along a lower edge of the seat backrest 11. Right and left side sections of the lower reinforcing member 3d are fixed on the side frames 3a.

A rod 2 and a support member 6 are attached to the frame 3 as shown in FIG. 2. The rod 2 is held at the upper and the lower ends by the frame 3. The pad 4 is attached on the front side of the rod 2, and the rod 2 elastically supports the back side of the pad 4. The rod 2 has a body member 2a and an attachment member 2b that is attached to the lower section of the body member 2a.

The body member 2a is made of a metal member that is elastically deformable as shown in FIG. 2. The body member 2a has a first section 2a1 through an eighth section 2a8 in one body. A pair of first sections 2a1 respectively extend in the upward and downward direction and are mounted on the upper reinforcing member 3c with clips 7 in a vertically movable manner.

Figure 6:
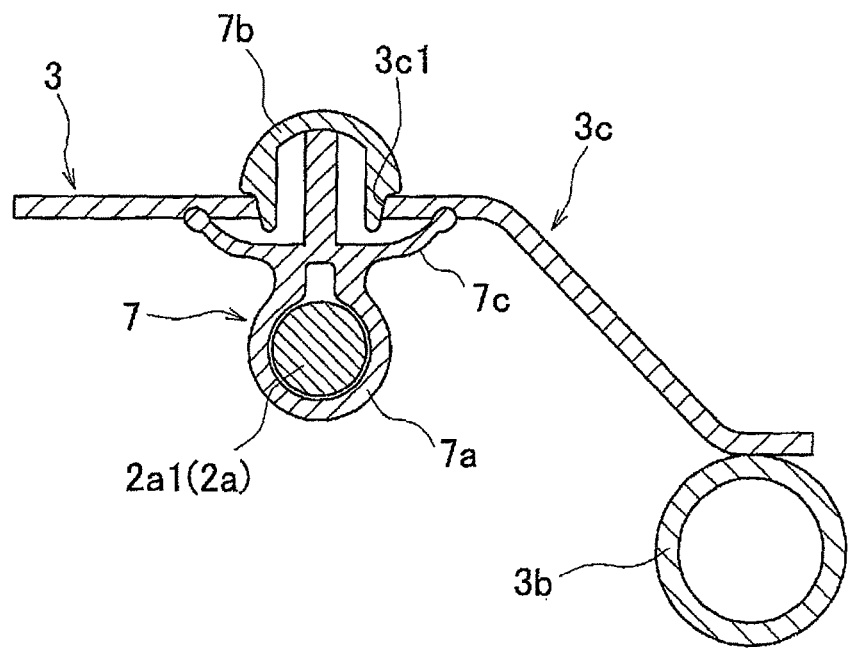
FIG. 6 is a cross-sectional view that is taken along VI-VI line in the direction of an arrow in FIG. 2.

The clip 7 has a holding section 7a, an engagement section 7b and an arm section 7c in one body as shown in FIG. 6. The holding section 7a slidably holds the first section 2a1 of the body member 2a. The engagement section 7b is inserted into a mounting hole 3c1 that is formed in the upper reinforcing member 3c while being elastically deformed and elastically engaged with the upper reinforcing member 3c. The arm section 7c elastically pushes the upper reinforcing member 3c so as to press the engagement section 7b against the upper reinforcing member 3c.

As shown in FIG. 2, the second section 2a2 of the body member 2a extends, from a lower part of the first section 2a1, downward and toward another second section 2a2. The third section 2a3 extends downward from the lower end of the second section 2a2. The support member 6 is attached on the front side of the second sections 2a2. The support member 6 is made of resin and arranged in the height of a lumber part of a user to support the lumber part from the back side via the pad 4.

The fourth section 2a4 of the body member 2a extends from the lower part of the third section 2a3 in an outward direction of the seat backrest 11. The fifth section 2a5 extends downward from the end of the fourth section 2a4. The sixth section 2a6 extends from the lower end of the fifth section 2a5 toward another sixth section 2a6. The seventh section 2a7 extends upward from the end of the sixth section 2a4. The eighth section 2a8 extends in the width direction to connect an upper part of the seventh sections 2a7. The attachment members 2b are attached in the lower right side section and the lower left side section of the body member 2a.

Figure 3:
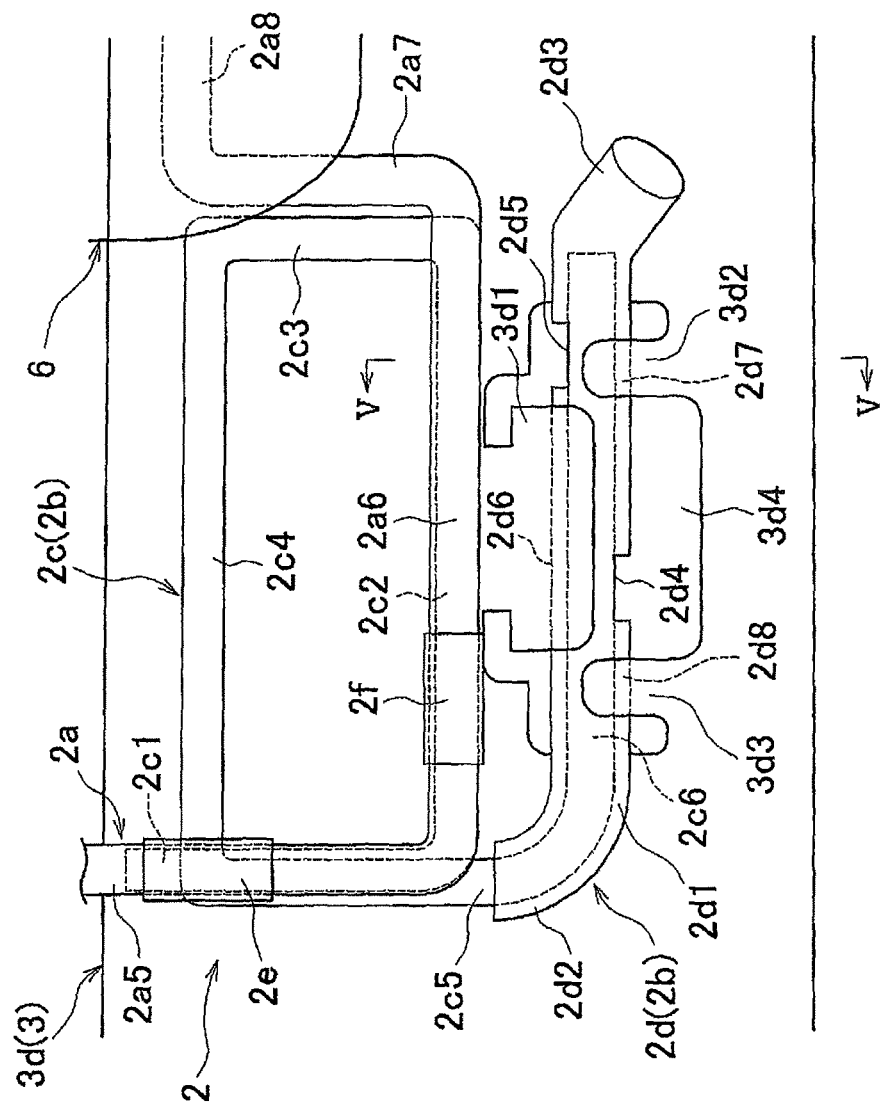
FIG. 3 is a partial front view of a frame, a rod, and a support member of the vehicle seat according to the embodiment.

The attachment member 2b as shown in FIG. 3 has a rod core 2c and a resin member 2d that covers an end of the core 2c. The core 2c is made of an elastically deformable metal and has a first section 2c1 through a sixth section 2c6 in one body. The first section 2c1 extends in the upward and downward direction along the fifth section 2a5 of the body member 2a.

The first section 2c1 is attached to the fifth section 2a5 with a caulked member 2e. The second section 2c2 extends from the lower end of the first section 2c1 in the width direction along the sixth section 2a6 of the body member 2a. The second section 2c2 is attached to the sixth section 2a6 with a caulked member 2f.

Figure 4:
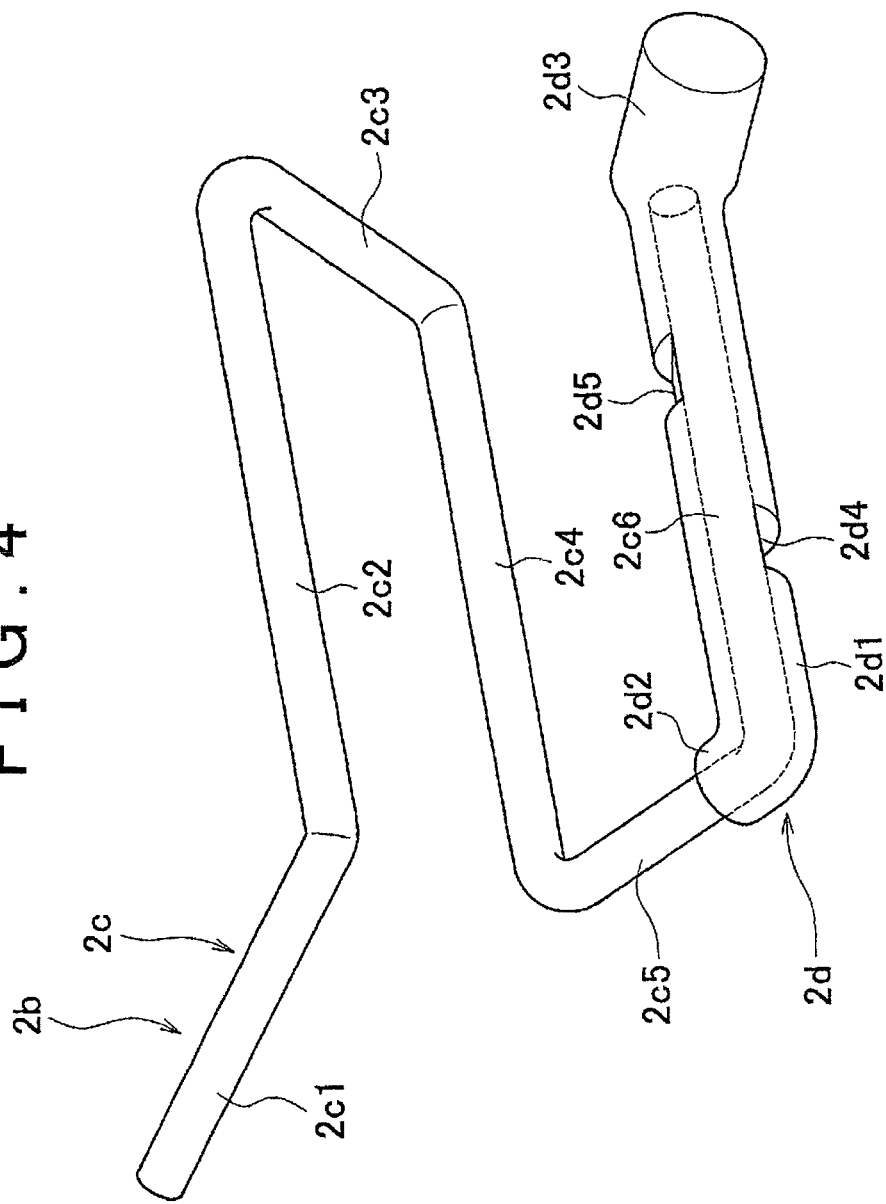
FIG. 4 is a perspective view of an attachment member of the rod of the vehicle seat according to the embodiment.

The third section 2c3 of the core 2c extends from the second section 2c2 to the upper side and the back side as shown in FIGS. 3 and 4. The fourth section 2c4 extends from the upper end of the third section 2c3 in the width direction to the side of the first section 2c1. The fifth section 2c5 extends from the end of the fourth section 2c4 to the lower side and the back side. The sixth section 2c6 extends from the lower end of the fifth section 2c5 in the width direction. The sixth section 2c6 is locked on hooks 3d1 through 3d3 that is formed on the lower reinforcing member 3d. The attachment member 2b elastically holds the body member 2a to the lower reinforcing member 3d in a movable manner in the forward and backward direction.

The resin member 2d has, for coating the end of the core 2c as shown in FIG. 4, a resin body section 2d1, a corner section 2d2, and a falling prevention section 2d3, in one body. The resin body section 2d1 covers the outer surface of the sixth section 2c6 of the core 2c. The corner section 2d2 covers the outer surface of the corner between the fifth section 2c5 and the sixth section 2c6 of the core 2c. Accordingly, the corner section 2d2 prevents the resin member 2d from falling out of the core 2c in the axial direction.

The falling prevention section 2d3 extends from the end of the resin body section 2d1 and bends with respect to the resin body section 2d1 as shown in FIGS. 3 and 4. The falling prevention section 2d3 has a larger diameter than the resin body section 2d1. The falling prevention section 2d3 lies adjacent to a second hook 3d2 of the lower reinforcing member 3d. Accordingly, the falling prevention member 2b restricts the movement of the attachment member 2b in the width direction over the second hook 3d2 and prevents the attachment member 2b from falling out of the second hook 3d2.

Figure 7:
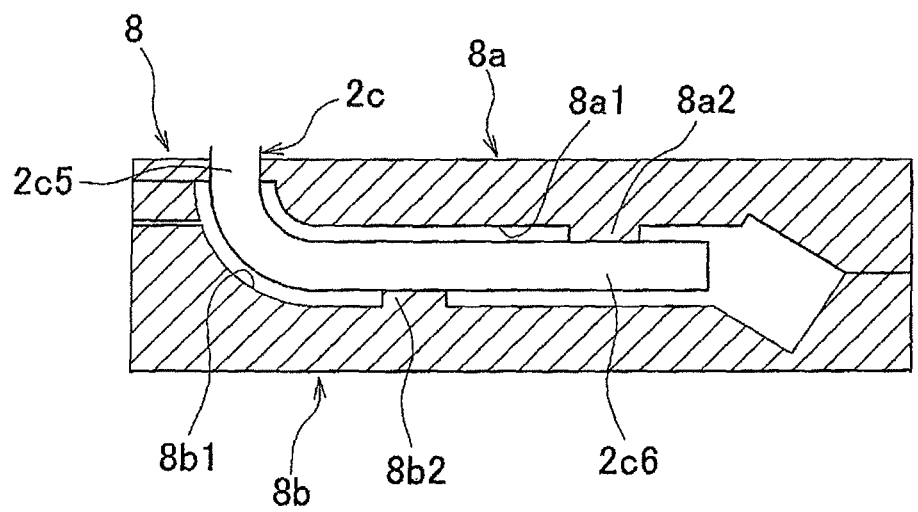
FIG. 7 is a cross-sectional view of a forming mold when the core of the vehicle seat according to the embodiment is placed on the forming mold.

The resin member 2d is formed by injection molding with a forming mold 8 as shown in FIG. 7. The forming mold 8 has a first mold 8a and a second mold 8b, and respective molds 8a and 8b are formed with cavities 8a1 and 8b1 and projections 8a2 and 8b2. When the first and the second molds 8a and 8b are closed, the end of the core 2c is placed in the cavities 8a1 and 8b1. One side surface of the core 2c in the radial direction comes into contact with the projection 8a2, and the other side surface comes into contact with the projection 8b2. Thus, the core 2c is positioned in the forming mold 8.

The resin member 2d as shown in FIGS. 3 and 4 is formed through the injection of heated liquid resin into the cavities 8a1 and 8b1 of the forming mold 8 and cooling of the liquid resin within the forming mold 8. Accordingly, the resin member 2d covers and is fixed on the end of the core 2c. Recesses 2d4 and 2d5 are formed on the resin member 2d by the projections 8a2 and 8b2 of the forming mold 8. The recesses 2d4 and 2d5 are recessed on the outer surface of the resin member 2d toward the center in the radial direction.

Figure 5:
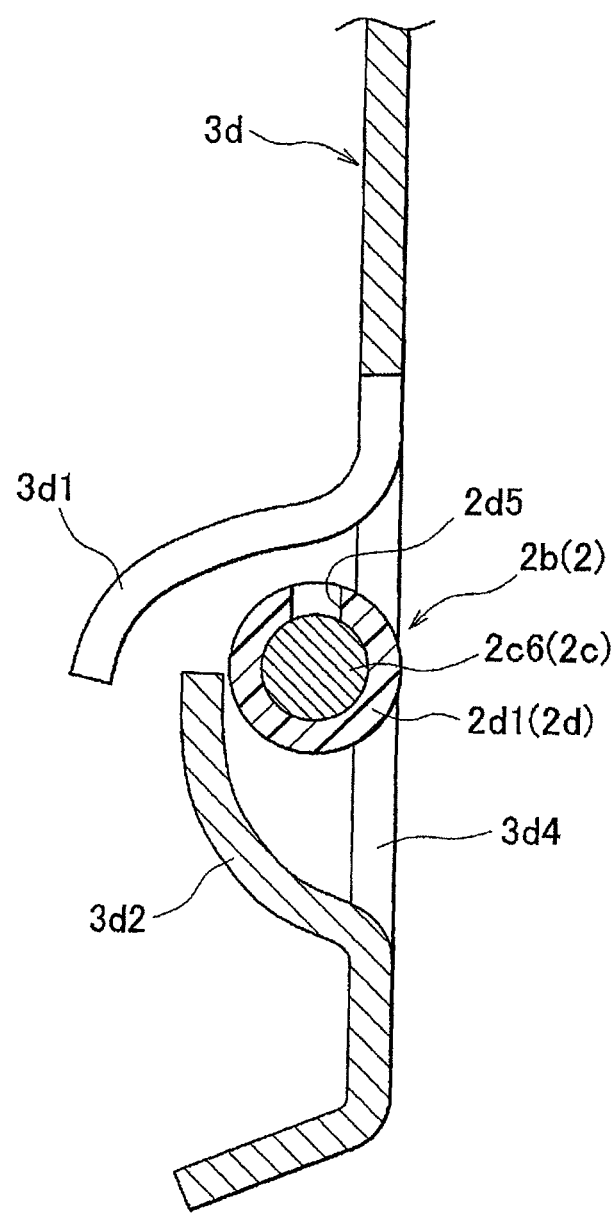
FIG. 5 is a cross-sectional view that is taken along V-V line in the direction of an arrow in FIG. 3.

Referring to FIGS. 3 and 5, the lower reinforcing member 3d is formed with first hook 3d1 through third hook 3d3. The first hook 3d1 through the third hook 3d3 are formed through provision of a notch 3d4 on the lower reinforcing member 3d and raising-up of a part of the lower reinforcing member 3d to the front side. The first hook 3d1 extends from an upper edge of the notch 3d4 to the lower side and the front side. The second and the third hooks 3d2 and 3d3 are respectively located on the right and left sides of the first hook 3d1 and extend from a lower edge of the notch 3d4 to the upper side and the front side.

Referring to FIGS. 3 and 5, the attachment member 2b is locked on the first hook 3d1 through the third hook 3d3. The first hook 3d1 extends from the upper side of the resin body section 2d1 to the lower side thereof and covers a first side section 2d6 of the resin body section 2d1. The first side section 2d6 lies in one side (upper side) of the resin body section 2d1 in the radial direction and abuts against the first hook 3d1 or lies in the most vicinity of the first hook 3d1.

Referring to FIGS. 3 and 5, the second and the third hooks 3d2 and 3d3 extend from the lower side to the upper side of the resin body section 2d1 and cover a second side section 2d7 and a third side section 2d8 of the resin body section 2d1, respectively. The second side section 2d7 and the third side section 2d8 lie in one side (lower side) of the resin body section 2d1 in the radial direction and abut against the second and the third hooks 3d2 and 3d3 or lie in the most vicinity of the second and the third hooks 3d2 and 3d3, respectively.

As shown in FIG. 3, the first recess 2d4 and the first hook 3d1 are positioned to overlap each other in the longitudinal direction of the resin body section 2d1. The first recess 2d4 and the first hook 3d1 are positioned on the opposite sides in the radial direction with respect to the resin body section 2d1. The second recess 2d5 and the second hook 3d2 are positioned to overlap each other in the longitudinal direction of the resin body section 2d1. The second recess 2d5 and the second hook 3d2 are positioned on the opposite sides in the radial direction with respect to the resin body section 2d1.

As described above, the vehicle seat 1 has, as shown in FIGS. 2 and 3, the frame 3, the rod 2 of which the ends are held by the frame 3, and the pad 4 of which the back side is supported by the rod 2. The rod 2 has the metal core 2 and the resin member 2d that is produced through the injection molding under the state where the core 2c is set in the forming mold 8 shown in FIG. 7 and the core 2c is positioned with respect to the forming mold 8 by the projections 8a2 and 8b2 of the forming mold 8 so as to cover the end of the core 2c. The resin member 2d is locked on the hooks 3d1 through 3d3 that are formed on the frame 3, and the recesses 2d4 and 2d5 of the resin member 2d that are formed by the projections 8a2 and 8b2 of the forming mold 8 are disposed in the position that is spaced from the hooks 3d1 through 3d3.

Therefore, the core 2c is positioned with respect to the forming mold 8 by the projections 8a2 and 8b2 of the forming mold 8. Thus, the relative position of the resin member 2d that is formed in the forming mold 8 and the core 2 can be determined accurately. Accordingly, the present invention contributes the reduction of the unevenness of the thickness of the resin member 2d that covers the outer surface of the core 2. The resin member 2d is formed with the recesses 2d4 and 2d5 that are formed by the projections 8a2 and 8b2 of the forming mold 8. An adjacent area of the recesses 2d4 and 2d5 of the resin member 2d has a lower strength than other areas; however, the recesses 2d4 and 2d5 are disposed in the position that is spaced from the hooks 3d1 through 3d3 of the frame 3 where the resin member 2d is locked. Thus, the adjacent area of the recesses 2d4 and 2d5 of the resin member 2d is hardly subjected to external force from the hooks 3d1 through 3d3 and therefore hard to break.

The first hook 3d1 extends from a first side to a second side of the resin member 2d in the radial direction and covers the first side section 2d6 of the resin member 2d as shown in FIG. 3. The first recess 2d4 lies in the opposite side to the first side section 2d6 of the resin member 2d in the radial direction. Thus, the first hook 3d1 and the first recess 2d4 may be spaced in the radial direction of the resin member 2d even if formed at the identical position in the longitudinal direction of the resin member 2d. Therefore, the first hook 3d1 and the first recess 2d4 can be arranged without elongation of the resin member 2d.

The second hook 3d2 is spaced from the first hook 3d1 in the longitudinal direction of the resin member 2d, extends from the second side to the first side of the resin member 2d in the radial direction, and covers the second side section 2d7 of the resin member 2d, as shown in FIG. 3. The second recess 2d5 lies in the opposite side to the second side section 2d7 of the resin member 2d in the radial direction.

Accordingly, the resin member 2d is covered from the both sides in the radial direction by the first and the second hooks 3d1 and 3d2. Therefore, the resin member 2d can be held tightly by the frame 3. The hooks 3d1 and 3d2 and the recesses 2d4 and 2d5 respectively lie in the opposite sides in the radial direction of the resin member 2d. Therefore, the hooks 3d1 and 3d2 and the recesses 2d4 and 2d5 can be respectively spaced in the radial direction of the resin member even if formed in the identical position in the longitudinal direction of the resin member 2d. Therefore, the hooks 3d1 and 3d2 and the recesses 2d4 and 2d5 can be arranged without elongation of the resin member 2d.

The present invention is not limited to the embodiment described above but may take the following form. For example, the rod 2 is attached to the frame 13 of the seat cushion 10, and the rod 2 may support the back side of the pad 14 of the seat cushion 10.

The body member 2a and the attachment member 2b of the rod 2 may be in separate bodies as the aforementioned embodiment or in one body. The frame 3 may be provided with a plurality of rods that extend in the upward and downward direction, and the plurality of rods may be disposed in parallel.

The rod 2 may have one end section that is attached to the side frame 3a and the other end section that is attached to the other side frame 3a or the upper reinforcing member 3c. The rod 2 may have one end section that is attached to the upper frame 3b and the other end section that is attached to the lower reinforcing member 3d or the side frame 3a.

The vehicle seat may be provided in aircrafts or boats.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicle seat comprising:
   a frame having an opening penetrating a surface of the frame and a plurality of hooks extending inwardly from an outer peripheral edge of the opening;
   a rod having ends held by the frame; and
   a pad having a back side supported by the rod,
   wherein the rod has:
      a metal core; and
      a resin member that covers the core and includes a plurality of recesses, the resin member being secured to the plurality of hooks on the frame, and the plurality of recesses extending from an outer surface of the resin member toward the core and disposed in the resin member so as to be spaced from the plurality of hooks.

2. The vehicle seat according to claim 1, wherein the plurality of hooks includes a first hook that extends from a first side to a second side of the resin member in a radial direction and covers a part of a first side section of the resin member, and wherein the plurality of recesses includes a first recess that lies in an opposite side to the first side section of the resin member in the radial direction.

3. The vehicle seat according to claim 2, wherein the plurality of hooks includes a second hook that is spaced from the first hook in a longitudinal direction of the resin member, extends from the second side to the first side of the resin member in the radial direction, and covers a part of a second side section of the resin member, and wherein the plurality of recesses includes a second recess that lies in an opposite side to the second side section of the resin member in the radial direction.

4. The vehicle seat according to claim 1, wherein the rod has:
   an attachment member that includes the core and the resin member; and
   a body member, and the body member is held by the frame with the attachment member.

5. The vehicle seat according to claim 4, wherein the body member and the attachment member are united.

6. The vehicle seat according to claim 1, wherein the frame is a frame of a seat backrest of the vehicle seat.

7. The vehicle seat according to claim 1, wherein the frame is a frame of a seat cushion of the vehicle seat.

8. The vehicle seat according to claim 1, wherein the plurality of recesses is positioned within the outer peripheral edge of the opening.

\* \* \* \* \*